(12) United States Patent
Van Den Berg

(10) Patent No.: US 8,397,670 B2
(45) Date of Patent: Mar. 19, 2013

(54) UNMANNED VEHICLE FOR SUPPLYING FEED TO AN ANIMAL

(75) Inventor: Karel Van Den Berg, Bleskensgraaf (NL)

(73) Assignee: Maasland N.V., Maasluis (NL)

( * ) Notice: Subject to any disclaimer, the term of this patent is extended or adjusted under 35 U.S.C. 154(b) by 0 days.

(21) Appl. No.: 12/565,026

(22) Filed: Sep. 23, 2009

(65) Prior Publication Data

US 2010/0006034 A1  Jan. 14, 2010

Related U.S. Application Data

(63) Continuation of application No. PCT/NL2008/000031, filed on Jan. 29, 2008.

(30) Foreign Application Priority Data

Mar. 26, 2007 (NL) ...................................... 1033590

(51) Int. Cl.
*A01K 5/02* (2006.01)

(52) U.S. Cl. ................ 119/14.11; 119/14.14; 119/51.02; 119/71

(58) Field of Classification Search ................ 119/14.01, 119/14.02, 14.08, 14.11, 14.14, 14.18, 51.01, 119/51.02, 51.5, 5, 7.1, 57.92, 174

See application file for complete search history.

(56) References Cited

U.S. PATENT DOCUMENTS

| | | | |
|---|---|---|---|
| 3,421,484 A * | 1/1969 | Flocchini | 119/71 |
| 3,628,506 A * | 12/1971 | Glasbergen | 119/61.2 |
| 4,560,270 A | 12/1985 | Wiklund et al. | |
| 5,070,483 A | 12/1991 | Berni | |
| 5,081,530 A | 1/1992 | Medina | |
| 5,109,362 A | 4/1992 | Berni | |
| 5,816,192 A * | 10/1998 | van der Lely et al. | 119/57.92 |
| 5,915,331 A | 6/1999 | Kimm | |
| 6,118,118 A | 9/2000 | van der Lely et al. | |
| 6,443,093 B1 * | 9/2002 | van der Lely et al. | 119/14.01 |

(Continued)

FOREIGN PATENT DOCUMENTS

| | | | |
|---|---|---|---|
| EP | 1523878 A1 | 4/2005 | |
| EP | 1762862 A1 * | 3/2007 | |
| JP | 2002-90454 A | 3/2002 | |
| NL | 6804964 A | 10/1969 | |
| NL | 1024522 C | 6/2005 | |
| WO | 96/14735 A1 | 5/1996 | |
| WO | 00/21359 A1 | 4/2000 | |
| WO | 00/70941 A1 | 11/2000 | |

*Primary Examiner* — Kimberly Berona
*Assistant Examiner* — Joshua Huson
(74) *Attorney, Agent, or Firm* — Hoyng Monegier LLP; Coraline J. Haitjema; David P. Owen

(57) ABSTRACT

An unmanned vehicle for supplying feed to an animal, which is provided with a frame, with propulsion mechanism disposed thereon, feed supplier for supplying feed and navigator connected to the propulsion mechanism with a sensor for forming an image of an observation area, wherein the sensor comprises: a source of radiation for emitting modulated electromagnetic radiation, a receiver device for radiation reflected by an object, comprising a matrix with rows and columns of receivers, an optical device and sensor image processor configured to determine for the receivers a phase difference between the emitted electromagnetic radiation and the reflected electromagnetic radiation in order to calculate a distance from the receiver to the object. Through use of the unmanned vehicle device an excellent and reliable navigation is possible, so that, for example, milk can be conveyed efficiently from a milking implement to a calf.

17 Claims, 3 Drawing Sheets

U.S. PATENT DOCUMENTS

| | | |
|---|---|---|
| 6,847,435 B2 | 1/2005 | Honda et al. |
| 7,663,502 B2 | 2/2010 | Breed |
| 2005/0076840 A1* | 4/2005 | Van Den Berg et al. ... 119/14.04 |
| 2005/0120965 A1* | 6/2005 | Van Den Berg et al. ... 119/14.02 |
| 2006/0041333 A1 | 2/2006 | Anezaki |
| 2010/0006034 A1 | 1/2010 | Van Den Berg |
| 2010/0006127 A1 | 1/2010 | Van Den Berg |
| 2010/0049392 A1 | 2/2010 | Vlaar et al. |
| 2010/0076641 A1 | 3/2010 | Van Den Berg |
| 2010/0154722 A1 | 6/2010 | Van Den Berg |

* cited by examiner

UNMANNED VEHICLE FOR SUPPLYING FEED TO AN ANIMAL

CROSS REFERENCE TO RELATED APPLICATIONS

This application is a continuation of international application no. PCT/NL2008/00031, filed on Feb. 14, 2008, and claims priority from Netherlands application no. 1033590 filed on Mar. 26, 2007. The contents of both applications are hereby incorporated by reference in their entirety.

BACKGROUND OF THE INVENTION

1. Field of the Invention

The invention relates to an unmanned vehicle for supplying feed to an animal.

2. Description of the Related Art

Such an unmanned vehicle is described, for example, in the non-published Dutch application U.S. patent application Ser. No. 2011-0174227, which is hereby incorporated by reference in its entirety. The described vehicle comprises means, in particular a drinking nozzle, for supplying liquid feed to an animal. It also comprises a microprocessor for controlling its movement from and to feed loading and feed unloading places, as well as position determination means known per se, but not further elaborated.

BRIEF SUMMARY OF THE INVENTION

The unmanned vehicle according to the invention comprises a frame, with disposed thereon a propulsion mechanism; a feed supplier for supplying feed, and a navigator connected to the propulsion mechanism with a sensor for forming an image of an observation area, where the sensor includes a radiation source for emitting modulated electromagnetic radiation, in particular light, a receiver device for receiving electromagnetic radiation reflected by an object in the observation area, comprising a matrix with a plurality of rows and a plurality of columns of receivers, an optical device for displaying the reflected electromagnetic radiation on the receiver device, and a sensor image processor which is arranged to determine for each of the receivers a phase difference between the emitted electromagnetic radiation and the reflected electromagnetic radiation in order to calculate a distance from the receiver to the object.

A vehicle with such a sensor has the advantage of being capable of forming a very accurate and flexible image of the environment, so that it is also capable of navigating through its environment in a more reliable, faster and more flexible manner. Due to this, it is also capable of performing additional tasks besides navigating, as will be explained hereinafter in further detail. More precisely, the sensor image processor calculates the distance from the receiver to the part of the observation area displayed on that receiver. For the sake of convenience, the latter distance will be denoted hereinafter by distance from the receiver to an object in that observation area. That object then relates advantageously to an animal or a feed trough to which feed should be supplied, a feed loading place, etc.

By using such a matrix of receivers and by determining for these receivers a distance, like in this case by phase shifting of the emitted light, it is possible to obtain per observation a complete spatial image. This spatial image is in fact composed in one go, instead of by scanning. All this will be explained hereinafter in further detail.

In one embodiment, the sensor image processor is configured to form a three-dimensional image of the observation area, in particular of an object therein. In principle, the series of measured distances will suffice, but it may be advantageous to produce also a three-dimensional image, for example for visual control. In this case, the image formed is transferred to a display screen or the like. In this case, the distance may, for example, be displayed by false colours, or the image may be rotated, etc.

It should be noted that the optical device, i.e. the lens or lenses, is an optical system which casts an image of the observation area onto the receivers, and which determines from what direction measurement takes place. There may be selected a wide or narrow angle of view of the observation area. Advantageously, the optical device comprises an adjustable optical device by which the angle of view can be selected, such as a zoom optical device.

It should be noted that the sensor is additionally also suitable as an "ordinary" camera, i.e. a 2D camera which is capable of recording grey tone values. In this case, the emitted and reflected radiation is not recorded as a matrix of depth or distance data, but as an image of the observation area. On the basis of this image, and in particular grey tone values, additional information may be obtained. In particular, the sensor image processor is configured to recognize an object in a thus produced grey tone values image. An example here is the recognition of a dark coloured animal on sawdust or the like. Dark animal skin will in general have a low reflection capacity (be dark), while sawdust is often light coloured. All this may depend on the radiation applied by the sensor.

In particular, the sensor image processor is arranged to determine repeatedly an image of the observation area, in particular of an object therein. Although, in principle, determining a three-dimensional or not three-dimensional image only once is sufficient for performing the further control on the basis thereof, it is advantageous to perform this determination a plurality of times (successively). It is thus possible to take into account changing circumstances, and in particular movements of an animal or the like that is present.

Below, a sensor of the vehicle according to the invention will briefly be explained in further detail. The source of radiation emits electromagnetic radiation. Preferably light is used for this purpose, more preferably infrared radiation, more preferably near-infrared (NIR) radiation. For this purpose, suitable LEDs can be used which are very easy to drive by an electrically controllable supply current, and which are, in addition, very compact and efficient and have a long service life. However, it is also possible to use other sources of radiation. The advantage of (near-)infrared radiation is that the radiation does not irritate animals that may be present.

The radiation is modulated according to a modulation frequency which is, of course, different from and much lower than the frequency of the electromagnetic radiation itself. Infrared light, for example, is in this case a carrier for the modulation signal. The modulation helps to determine the phase difference of emitted and reflected radiation. Preferably, the modulation is amplitude modulation.

The emitted radiation determines the distance by measuring a phase shift of the modulation signal, by comparing the phase of reflected radiation with the phase of reference radiation. For the latter, the emitted radiation is mostly (almost) directly passed on to the receiver, in any case with a known distance between the source and the receiver, so that the actual distance can easily be determined from the measured phase difference by applying Distance=½×wavelength×(phase difference/2 pi), wherein the wavelength is that of the modulation signal. Please note that the above relation does not make allowance for unique determination of the distance which results from the fact that a phase difference, due to the periodicity, may be associated with a distance A, but also with A+n×(wavelength/ 2). For this reason, it may be sensible to select the wavelength of the amplitude modulation in such a manner that the distances which occur in practice are indeed uniquely determined.

Preferably, a wavelength of the amplitude modulation of the emitted light is between 1 mm and 20 m. Hereby distances may be uniquely determined up to a maximum distance of 0.5 mm to 10 m. In practice, often a sub-range of that distance is adhered to, for example between 0.5 mm and 5 m, due to loss of light and, partially as a result thereof, noisy and possibly inaccurate measurements. A modulation frequency of 300 MHz to 15 kHz is associated therewith, which modulation frequency can easily be realized in electric circuits for controlling LEDs. It should be noted that, if desired, it is also possible to select even smaller or larger wavelengths. It is advantageous, for example, to select the wavelength in dependence on the expected to be determined distance. For example, when looking for material to be removed, that distance will often be between 10 cm and 100 cm, so that a preferred wavelength range will be between 20 cm and 200 cm, and consequently a preferred frequency range will be between 1.5 MHz and 150 kHz.

In one embodiment, a wavelength is adjustable, in particular switchable between at least two values. This provides the possibility of performing, for example, first a rough measurement of the distance and/or size, by the large modulation wavelength. For, this wavelength provides a reliable measurement over great distances, albeit with an inherent lower resolution. Here, it is assumed for the sake of simplicity that the resolution is determined by the accuracy of measuring the phase, which can be measured, for example, with an accuracy of y %. By first measuring at the large wavelength it is possible to measure the rough distance. Subsequently, it is possible to perform, at a smaller wavelength, a more precise measurement, wherein the unique determination is provided by the rough measurement.

For example, first a measurement is performed at a wavelength of 2 m. The accuracy of the phase determination is 5%. The measured phase difference amounts to (0.8×2 pi)±5%. The measured distance then amounts to 0.80±0.04 m. The next possibility would be 1.80±0.04 m, which, however, can be excluded on the basis of the expected distance. Subsequently, measurement is performed at a wavelength of 0.5 m. The measured phase difference 0.12×2 pi modulo 2 pi, and again with ±5%. This means that the distance amounts to 0.12×0.25 modulo 0.25, so 0.03 modulo 0.25 m. As the distance should moreover amount to 0.80±0.04, the distance should be equal to 0.78 m, but now with an accuracy of 0.01 m. In this manner the accuracy can be increased step by step, and the different modulation wavelengths can be selected on the basis of the accuracy of the previous step.

In one embodiment, the sensor, at least a provided sensor control, is arranged to automatically adjust the wavelength or, of course, the frequency, to the determined distance. This makes it possible to determine the distance and/or size more accurately in a next step.

It is also advantageous, for example, first to determine roughly the position/distance/size at a large wavelength, and subsequently to determine the speed from the change of position, which can indeed be uniquely determined from the change of the phase difference, and then preferably measured at a smaller wavelength.

In one embodiment, the source of radiation emits radiation in a pulsed manner, preferably at a pulse frequency of between 1 Hz and 100 Hz. Here, the pulse length is preferably not more than ½ part, more preferably 1/n part of a pulse period. This provides radiationless pauses between the pulses, which may be used for other purposes, such as data transmission. For this purpose, the same source of radiation could then be used for example, but now with a different transmitter protocol; however, no measurement nevertheless being suggested or disturbed by the sensor. Additionally, it is possible to operate a different source of radiation and/or sensor in the pauses, in which case mutual interference neither takes place.

Preferably, the source of radiation has an adjustable light intensity and/or an adjustable angle of radiation. This provides the possibility of adapting the emitted radiation intensity or the emitted amount of radiation energy to the light conditions, which may result in energy saving. In the case of a short distance and a strong reflecting capacity, for example, less radiation is required than in the case of a great distance and a relatively strong absorbing capacity, of, for example, a dark skin spot or the like. It is also possible to adapt the angle of radiation to the angle of view of the sensor, because the radiation angle of view need not be greater than that angle of view. It may be advantageous, for example, when navigating through a space, to select a great angle of radiation, such as for example between 80° and 180°, because the angle of view used in that case will often be great as well. On the other hand, when 'navigating' on a part of an animal, such as a mouth or the like, the angle of radiation may also be selected as a smaller one, such as for example between 30° and 60°. Of course, other angles of radiation are possible as well.

Alternatively or additionally, a sampling time of the sensor may be adjustable. For example, there is provided a mode in which a sampling time has been prolonged, for example has been doubled. Also in this manner it is possible to adapt the implement to more unfavourable conditions, because the totally received amount of light increases. This may be advantageous, for example, at low reflection of the objects and the environment, or if there is, on the contrary, much scattered light. By way of example, a standard sampling time is 8 ms, whereas for difficult conditions the sampling time may be prolonged, to for example 16 ms.

In a particular embodiment, the receiver device, and advantageously also the source of radiation, is disposed rotatably. This provides the advantage that for efficient navigation not the entire vehicle, but only the receiver device and, possibly, also the source of radiation, has to be rotated. The vehicle then 'looks about' as it were. This is in particular advantageous if the angle of view, and possibly also the angle of radiation, is relatively small, in order to ensure in this manner a relatively high resolution. However, it is also possible, of course, to dispose the receiver device and the source of radiation rigidly, for the purpose of a greatest possible constructional simplicity. Additionally or alternatively, the receiver device, and advantageously also the source of radiation, may be telescopic. As a result thereof, the sensor may, if not required, e.g. be protected from influences from outside, while it may assume a favourable observation position, if this is desired.

In another embodiment, the sensor comprises receivers that are positioned in such a manner that the sensor has an observation area with an angle of view of at least 180°, preferably of substantially 360°. In this case, it is possible to use either a single ultra wide-angle lens ('fisheye') to cast the image on the sensor, but it is also possible to use a sensor with a plurality of (image) surfaces, and associated lenses, or in other words a sensor with a plurality of sub-sensors, which comprise each a plurality of rows and columns of receivers. The advantage of this embodiment is that it is capable of overlooking in one go the complete forward field of view to move in one direction, and even of observing a complete around-image. This is particularly favourable for navigating and guiding.

In another embodiment, an angle of view of the observation area of the sensor is adjustable. The angle of view may then be selected, for example, in accordance with the observation object or area. It may also be advantageous to keep disturbing radiating objects, i.e. hot objects, such as incandescent lamps, away from the observation area by advantageously selecting the angle of view. For this purpose, it is possible, for example, to dispose an objective (lens) with variable focal distance ('zoom lens') in front of the sensor. It is also possible to select only a limited area of the receivers of the sensor. This is comparable with a digital zoom function.

Advantageously, at least a part of the sensor, in particular a source of radiation and/or the receiver device, is resiliently suspended from the frame. An advantage thereof is that, for example, an animal such as a cow will less quickly get injured by the sensor which, of course, often projects to some extent, and thus forms a risk for legs and the like. On the other hand, the source of radiation and/or the receiver device are/is thus better protected from jolts caused by, for example, the same legs.

In another embodiment, the navigator are operatively connected to the sensor, in particular to the sensor image processor, and more in particular the navigator comprises the sensor. As already pointed out now and then in the foregoing, the present invention may not only be applied for, for example, detection of and guiding to a desired object, but also, for example, for guiding the vehicle as a whole to, for example, a recharging point, etc. It is then possible for the navigator to receive information via the sensor, in order thus to be able to map out a route.

In particular, the image recognizer comprises previously stored information regarding position and/or orientation of one or more reference objects. Advantageously, the sensor image processor is moreover arranged for orientation in the observation area on the basis of comparing the observed image with the stored information. Very efficient navigation is thus possible. Examples of reference objects are a door, a box, a beacon or the like. Advantageously the reference object comprises a marking, in particular a line or pattern on a floor of, for example, a shed, in which case the reference object has a high reflection coefficient for the emitted radiation. The line or the pattern may be used as an easily to be orientation recognizer, while the high reflection ensures a reliable signal. Such a reference object is advantageous if the vehicle often follows the same route, for example from a milking implement to a box for a calf or to a feed unloading place.

In a particular embodiment, if the object in the observation area comprises a plurality of sub-objects, the sensor is configured to distinguish the plurality of sub-objects, i.e. to recognize and process a plurality of objects in one image. This may be distinguished, for example, because in the group of points from which radiation is reflected there is a discontinuously changing distance between at least a first group of points and a second group of points. It is thus possible, for example, to distinguish between a plurality of animals.

In another embodiment, the sensor image processor is arranged to determine a mutual distance between two of the plurality of sub-objects. This is, for example, advantageous when navigating, because the sensor or the navigator are then able to determine whether the vehicle can pass through between the two sub-objects.

In a further embodiment, the sensor image processor is arranged to determine repeatedly, from an image of the observation area, a position and/or a mutual distance to the material to be removed. It is sufficient per se to determine only once the relevant position and/or the mutual distance to that material. However, it is advantageous to do this repeatedly, because the vehicle is thus able to anticipate, for example, unforeseen changes, such as an animal that comes into the path of the vehicle. Therefore, the vehicle according to this embodiment is capable of following an animal that may be present in a very efficient manner in the case of such movements.

In another embodiment, the sensor image processor is arranged to calculate, from a change of the position and/or the mutual distance, the speed of the vehicle relative to a target or object in the environment, and in particular to minimize, advantageously on the basis of the calculated speed, the mutual distance between the vehicle and the target to be reached, which will effect an even more efficient navigation.

In particular, the sensor image processor is arranged to recognize at least one of a feed loading place, a feed unloading place, an animal and a part of an animal. Such sensor image processor may, for example, be based on recognition of animals on the basis of the size thereof, by means of shape or pattern recognition or the like. In particular, this may be of importance for safety.

In this case, a feed unloading place may relate, for example, to a feed trough (drinking trough), or more in general to a place where the feed should be supplied. If such recognizer is incorporated in the sensor image processor, or, of course, in a control device which is operatively connected thereto, the vehicle is very well capable of finding in an efficient manner its way to an indicated target, such as an animal to be fed, or, on the contrary, around such a target. Also avoiding obstacles may be provided by first of all recognizing these, for example as a wheelbarrow, tractor, etc., and subsequently choosing a path around these obstacles. Needless to say that such a vehicle is capable of saving a lot of labour. Moreover, it is possible to apply a very animal-friendly animal recognition, and to recognize an animal or the like already at a large distance, and even to make already a record of a not marked or not chipped animal and to link an animal identification thereto afterwards.

The sensor image processor may be configured to adapt, if an obstacle is detected, the position and/or the speed of the vehicle. For example, if an animal, a child or other moving object is recognized, the speed will be reduced, if desired to zero. In the case of unknown obstacles, a warning signal may be supplied, if desired.

In a particular embodiment, the vehicle further comprises one or more animal identifiers. These may, for example, comprise transponders which are capable of reacting to, for example, an earmark or implemented chip. Due to this, a very fast and reliable identification is possible, which, however, depends on the presence of such an identifier.

In another embodiment, the image recognizer is further arranged to determine changes in the identified animal, in particular in the height and/or size thereof. It is thus possible, for example, to update the growth of an animal, its udder size, etc., which may influence the amount of feed to be supplied. The image recognizer may also be arranged to determine abnormalities in, for example, the skin, the head, etc. of the animal, by comparing the image determined with a reference.

In advantageous embodiments, the vehicle, and more in particular the feed supplier, are arranged to supply liquid feed. In the case of solid feed, it is sufficient to offer a partially open trough with the solid feed present therein in such a position that the animal is able to eat. In the case of liquid feed, it is possible to obtain a better result by making use of the flow properties, of, for example, milk, water, pulp-like substances, etc. For, there may be provided a substantially closed feed supplier with a feed supplying aperture which is capable of being positioned in a suitable position, advantageously in a sensor-controlled manner.

In embodiments, the feed supplier comprises an operable valve or a drinking nozzle, advantageously a flexible teat. By means of an operable valve it is, for example, possible to supply feed in a feed trough associated with an identified animal, if necessary. It may concern liquid feed, such as milk or water. For liquid feed, and in particular for milk, a drinking nozzle, such as a flexible teat, is particularly suitable, because it comes very close to natural feeding. Advantageously, the drinking nozzle is movably mounted relative to the rest of the vehicle. Here, a very great advantage of the invention emerges, because by means of the sensor and the image recognizer it is possible to bring the drinking nozzle in a very reliable and fast manner to the mouth of the animal. In this case, it is possible to determine the desired position, to take an animal's posture, changes thereof, etc., into account. The drinking nozzle being movable helps in this case to adapt the vehicle to different sizes and postures of the animal. Something like that also holds for the valve which may, for example, also be adaptable to different feed trough heights.

It should be noted that from U.S. Pat. No. 5,816,192, hereby incorporated by reference in its entirety, an autonomously displaceable vehicle for supplying feed to a feed unloading place is known per se. However, this known vehicle is not provided with such a sensor and is neither suitable for supplying liquid feed, such as milk, directly to an animal, such as a calf.

The feed trough may concern an external feed trough, in particular a milk or water container, but a feed trough may also be provided on the vehicle. This provides optimum control over the amount and kind of feed supplied, as well as a reliable measurement of the amount of feed consumed.

In another embodiment, the feed supplier is controllable by the image processor and/or by means of the identifier. In this case, the feed supplier may be arranged to be controllable for supplying feed if this is desired for the identified animal, for example on the basis of the previously supplied amount of feed and the estimated feeding need. Both the valve and the drinking nozzle may be controllable, for example for supplying or not supplying feed, for selecting a kind of feed, if a plurality of kinds of feed are provided in the vehicle, etc. Through the use of the animal identification signal it is possible to apply the relevant settings, such as mouth height, feeding or not feeding, etc., in a reliable manner.

Advantageously, the image recognizer is arranged to determine the amount of feed in a feed trough. Through the use of the image recognition, in particular 3 D, it is possible to determine in a reliable manner a height and/or volume of the feed, and thus also a possible need for supplying feed in that feed trough. This holds both for a feed trough on the vehicle and for an external feed trough.

In another embodiment, the vehicle further comprises at least one of a connection for electrical feeding and a connection to a feed loading place for receiving feed, in particular liquid feed, wherein the sensor image processor is are arranged to couple the connection to a counter-connection for that connection, by recognizing the connection and the counter-connection and minimizing the mutual distance between the connection and the counter-connection. It is thus possible for such a vehicle to perform even more functions without the intervention of an operator. This means: the vehicle comprises controller, connected to the sensor image processor, which minimize, on the basis of the image of the connection and the counter-connection, the distance there between, in order thus to realize the coupling. In this case, the connection and/or the counter-connection are preferably self-searching. In this case, the coupling of the connection to the counter-connection may comprise steps that are comparable with the steps for, for example, determining the location of and navigating to an animal to be fed.

In other embodiments, the feed loading place comprises a milk storage vessel or milking implement, in particular an autonomously displaceable milking implement. It is then possible, for example, for the unmanned vehicle according to the invention to take itself a desired amount of milk from the storage vessel or to receive a desired amount of milk from the milking implement. This amount may, for example, be determined on the basis of animal identification. Subsequently, the vehicle moves to the relevant animal in order to supply the milk. If the vehicle collects the milk from a milking implement, it may even be arranged to collect milk obtained from a particular, identified mother animal, and to supply the collected milk to the young animal belonging to that mother animal. It is thus possible to provide a particularly suitable and very fast feeding regime. Of course, other regimes than mother-child regimes are possible as well.

In particular, according to the invention, the vehicle comprises a milking implement with automatically connectable teat cups and a milk storage vessel. Such a vehicle is suitable for collecting completely autonomously the milk needed and subsequently supplying it to an animal.

In general, it should be noted that the vehicle according to the invention is extremely suitable for feeding animals such as dairy animals, and in particular animals that are fed with milk, such as young animals and in particular calves. Owing to the fact that the vehicle is autonomously displaceable between one or more feed loading places and one or more feed unloading places, it is possible that the transport of the milk obtained to the calf is performed in a flexible manner by the vehicle, instead of, for example, by means of a known system of lines. Owing to the fact that the vehicle may comprise a drinking nozzle, such as a flexible teat, the milk can be supplied to the calf directly by the vehicle, so that additional lines for supplying the milk to the calf are neither needed.

In one embodiment of an implement according to the invention, the vehicle comprises one or more thermally insulating storage device for liquid feed. Such an insulating storage device, such as a storage device resembling a thermos jug, ensures that the temperature of the liquid feed obtained at the feed loading place will remain as constant as possible during transport to the feed unloading place. Because of the fast and reliable navigation which is possible by the vehicle according to the invention, the insulation need not be complex or expensive.

The invention also provides a, preferably passive, heat exchanger, such as for example a reservoir for and/or with water, for keeping the liquid feed at a particular temperature.

The invention also provides a device for supplying feed, in particular liquid feed, to an animal, comprising at least one feed loading place and at least one vehicle according to the invention. The feed loading places may comprise a storage vessel for, for example, water or milk, or a milking implement. Furthermore, the implement may comprise at least one feed unloading place, such as a feed trough. Also the drinking nozzle of the one or more vehicles may be considered as a feed unloading place.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
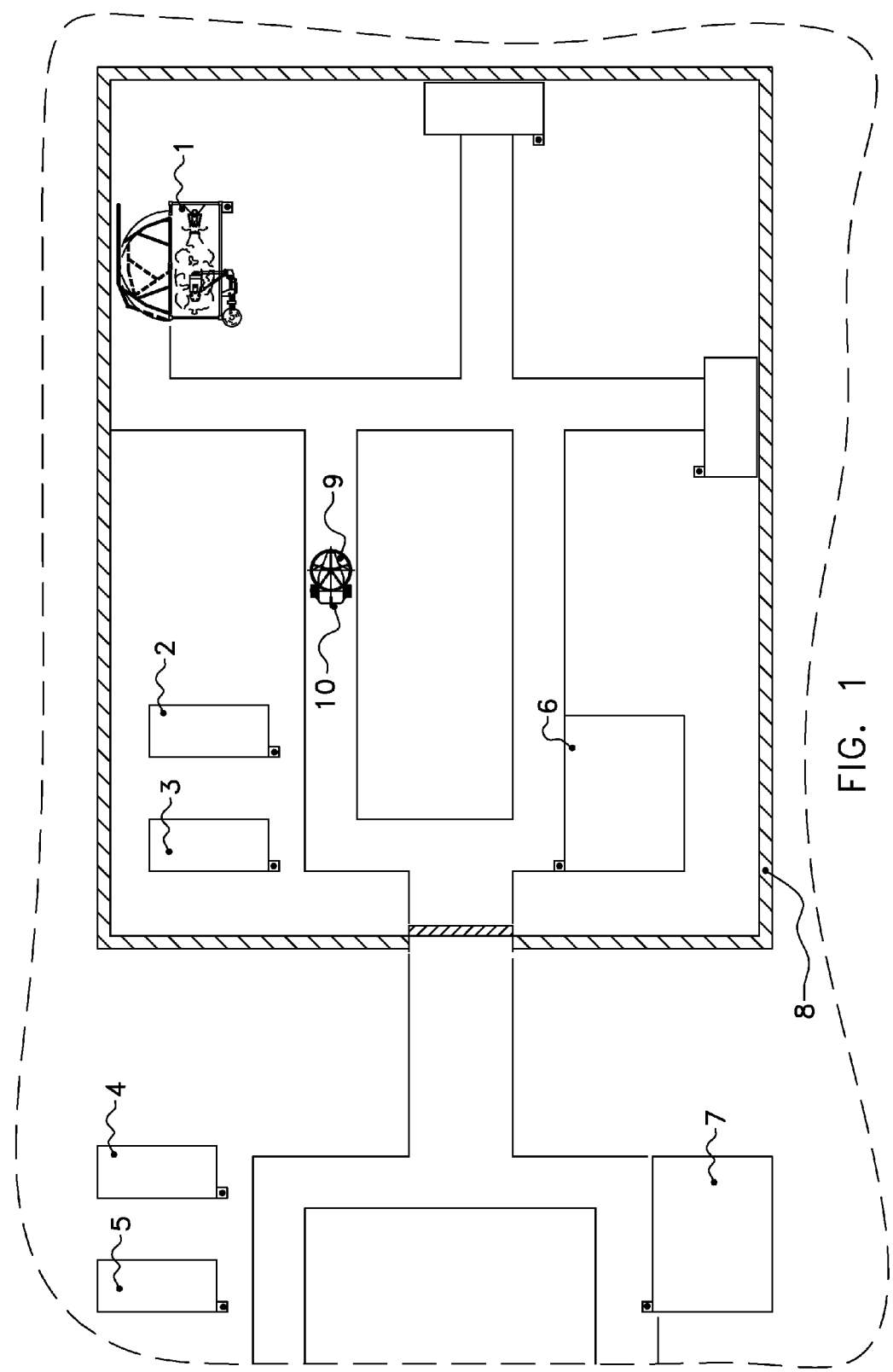
FIG. 1 is a schematic plan view of an implement with a vehicle according to the invention.

The following is a description of certain embodiments of the invention, given by way of example only and with reference to the drawings. A device for supplying, in this case liquid, feed to an animal, such as a calf, is shown in a diagrammatic plan view in FIG. 1. The implement comprises one or more feed loading places, in the embodiment shown in FIG. 1 a milking machine 1, in the example a milking machine with a (not shown) device for automatically connecting teat cups to teats of a dairy animal. The implement also comprises one or more feed unloading places 2-7, in the embodiment shown in FIG. 1 the feed unloading places 2, 3 and 6 being located in a shed 8 and the feed unloading places 4, 5 and 7 being located outside the shed 8. Furthermore, the feed unloading places 2, 3, 4, 5 are feed unloading places for containing only one animal, so-called igloo housings, and the feed unloading places 6, 7 are suitable for containing a plurality of animals.

The device further comprises one or more vehicles that are autonomously displaceable, controlled by a microprocessor or the like, between the milking machine 1 and the feed unloading places 2-7, only one vehicle 9 being shown in FIG. 1 for the sake of clarity, although it will be obvious that any other number of vehicles will also fall within the scope of the invention. Autonomously displaceable vehicles for performing many different functions, as well as the control of such vehicles, are known per se and will consequently not be described here in detail. Automatic charging of the energy supply of the vehicle and automatic loading and unloading of other materials into and from, respectively, containers present on the vehicle, are known as well. It will suffice to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. No. 5,341,540, U.S. Pat. No. 5,646,494, EP-0943235, EP-1369010, EP-1369012 en EP-1368017, each of which is incorporated by reference in its entirety.

For accurate position determination and identification of animals, the relevant milking machine 1 and, for example, the feed unloading places 2-7, the vehicle 9 comprises a sensor according to the invention, as well as, if desired, animal identifier such as transponder readers. Furthermore, the sensor and the navigation may be used to couple the vehicle 9 to a connection on the milking machine 1 in order to transfer, for example, milk. Navigation may take place by, for example, minimizing the distance between that connection and an associated connection on the vehicle 9, which connections may, for example, be self-searching.

Figure 2:
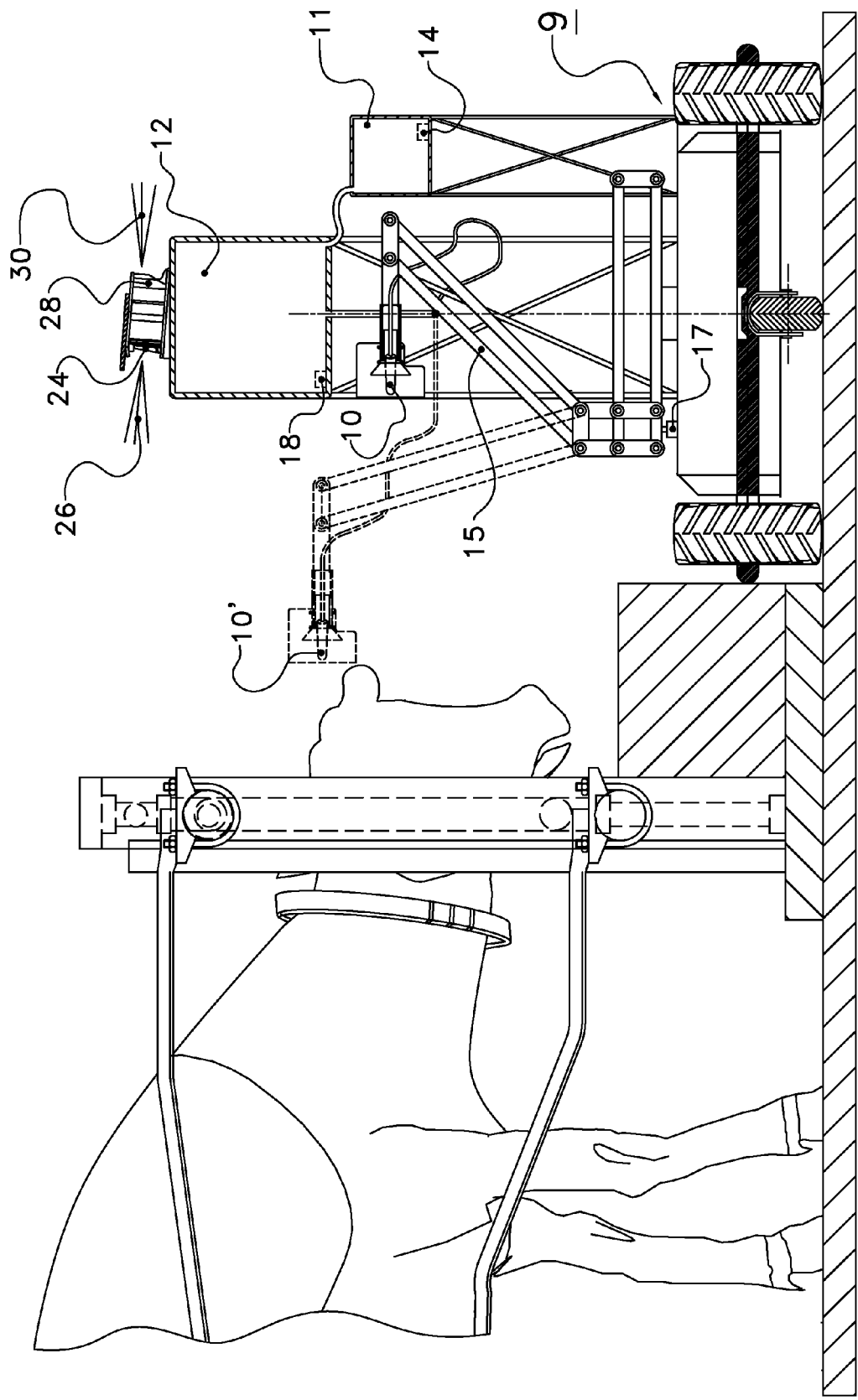
FIG. 2 is a schematic side view of a vehicle according to the invention.

According to the invention, the vehicle 9 comprises a drinking nozzle 10, such as a flexible teat, so that liquid feed carried by the vehicle 9, for example stored in a container, can be supplied to a calf present in the feed unloading places 2-7. Although the shed 8 may be thermally insulated from the outside environment to a certain extent, the environment will nevertheless influence the temperature of the liquid feed carried by the vehicle 9. In order to reduce this thermal influence by the environment as far as possible, the vehicle 9 comprises one or more thermally insulating storage device 11 for liquid feed (see FIG. 2). Although only one storage device 11 is shown in FIG. 2, two or more storage devices are also applicable in the invention. These thermally insulating storage device, which are known per se, make it possible to keep the temperature of the liquid feed stored therein constant for a long time, so that it is even possible for the liquid feed that is transferred to the feed unloading places 4, 5, 7 located outside the shed 8 to have at that location substantially the same temperature as the temperature of the liquid feed when the latter was supplied in the storage device 11.

FIG. 2 is a schematic side view of a vehicle 9 according to the invention. Here, it comprises a frame with a drinking nozzle 10 which is displaceable through the use of a parallelogram construction 15 having a height adjustment and a control cylinder 17, a storage device 11 and a reservoir 12 with hot water. 14 and 18 are each a temperature sensor for measuring the temperature of milk in the storage device 11 and the water in the reservoir 12, respectively.

By 24 and 28 are denoted (here) two sensors according to the invention, having respective image fields 26 and 30. The mode of operation of the sensors will be explained in further detail with reference to FIG. 3. It will suffice here that the image fields 26 and 30 are used to form 3 D-images of the environment, through which it is possible for the vehicle 9 to navigate, for example as a whole toward the animal shown on the left side, or to bring the drinking nozzle 10 to the mouth.

Through a parallelogram construction 15, for example, the drinking nozzle 10 is movable relative to the rest of the displaceable vehicle from a withdrawn first position of the nozzle 10 indicated by uninterrupted lines to an extended position of the nozzle 10' indicated by interrupted lines. This means that, on the one hand, it is possible, for example, to move the drinking nozzle 10' forward in such a manner that it is easily accessible for an animal and, on the other hand, it is possible to attune the position of the drinking nozzle to the dimensions of an animal by using, for example, a height adjusting device with a control cylinder 17. In the latter case, it is advantageous if the displaceable vehicle is provided with animal identifier for identifying an animal and for supplying an identification signal indicative of the identity of an animal, the identification signal, besides for other objectives, such as supplying particular sorts of feed, being used in particular for moving the drinking nozzle. By use of the sensor it is possible to control the movement from the nozzle to the mouth of the animal to be fed, such as a calf, in an optimum manner. Also when the animals move about freely, the sensor may be very useful, for example by identifying an animal or by navigating the vehicle toward an animal.

It should be noted that in this figure neither a milking robot nor components thereof, such as automatically connectable teat cups are shown, this in fact not being a characterizing part of the invention. For details, reference may be made, besides the know-how of the person skilled in the art, to inter alia U.S. Pat. No. 7,231,886, which discloses a trolley with automatically connectable teat cups, and which is hereby incorporated by reference in its entirety.

The milk obtained in the milking machine 1 being relatively warm, it is advantageous to transport the milk obtained as quickly as possible to a relevant animal in order that as little energy as possible is needed to keep the milk at a particular temperature. In an embodiment of an implement according to the invention, this is achieved in that the milking machine 1 comprises a detection device for detecting the arrival of an animal in the milking machine 1 and for supplying a detection signal. This detection signal may then be used for controlling the displacement of the displaceable vehicle 9, so that the vehicle is displaced to the milking machine 1. In this case, it is possible, of course, to make use of the navigation by the sensor according to the invention. In this manner it is possible for the vehicle 9 to arrive quickly at the milking machine 1 and to take milk that has cooled as little as possible from the milking machine 1, or a storage device located in its vicinity, and to transport it to the relevant feed unloading place 2-7. It should be noted that means for detecting that a particular animal has entered the milking machine are known per se. Also for this purpose, it is possible to use the sensor of the vehicle according to the invention.

The vehicle 9 is self-propelled, i.e. autonomously displaceable, by wheels driven by a not shown drive. The control of the drive is preferably connected to the sensor image processor and/or navigator that are not separately depicted here. In fact, it is advantageous, for reasons of compactness, to combine both the sensor image processor, the navigator, as well as the not shown robot controller and other controllers, if any, in one control device.

Figure 3:
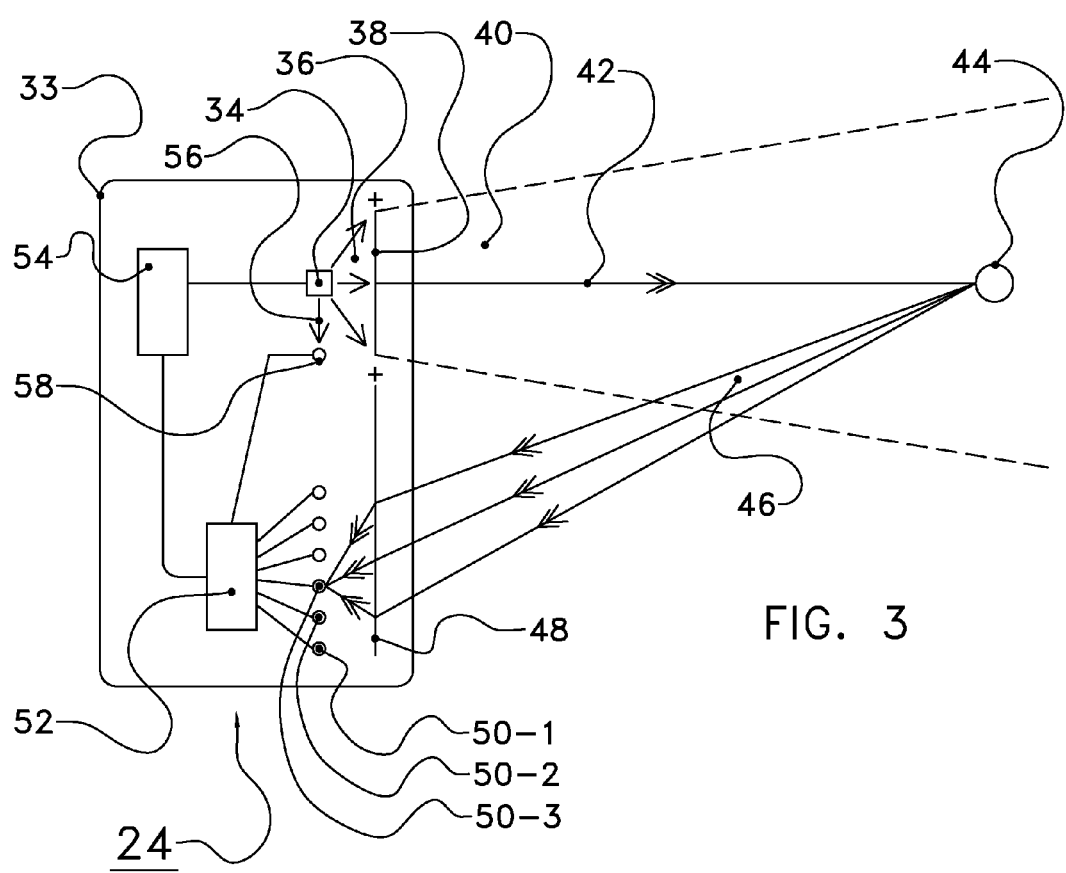
FIG. 3 is a schematic side view of a sensor of the unmanned vehicle according to the invention.

FIG. 3 is a schematic side view of a sensor of the unmanned vehicle according to the invention. The first sensor 24, at least a not separately shown light source thereof, emits a first light beam 26. The first observation area of the first sensor 24 substantially corresponds to the solid angle in which the first radiation beam 26 is emitted, but may also be smaller. Likewise, a not separately shown light source in the second sensor 28 emits a second light beam 30, and the second observation area will roughly correspond to the solid angle in which the second light beam is emitted.

The sensor 24 comprises a housing 33 with a light source 34 that emits light 36 which is formed by the exit optical device 38 into an outgoing beam 40. A first ray 42 thereof hits an object 44, such as a heap of manure, and is reflected as a reflected beam 46 which is displayed, via the entrance optical device 48, on a number of receivers 50-1, 50-2, 50-3, . . . The signals from those receivers are processed by the sensor image processing device 52 which is connected to the sensor control 54. The sensor control 54 is also connected to the light source 56 which also emits a reference ray 34 to the reference receiver 58.

The housing 33 is, for example, a moisture-proof and dust-proof housing of shock-proof synthetic material or metal, which may be fastened on the milking implement in a resilient or otherwise shock-absorbing manner. The housing 33 comprises a front side. At the front side there is included an exit optical device 38 which forms light 36 from one or a plurality of light sources 34 into a desired outgoing beam 40. The outgoing beam need not be wider than the desired observation area, and preferably corresponds thereto. For this purpose, the exit optical device 38 may advantageously be an adjustable or even a zoom lens.

In this embodiment, the light source 34 comprises infrared light emitting diodes (IR-LEDs), but may also comprise other colours of LEDs, or a laser diode, etc. It should be noted that everywhere in this document the term 'light' is used, but that this may generally be read as 'electromagnetic radiation'. The light source 34 is connected to the sensor control 54 which, for example, applies an amplitude modulation signal over the control current of the IR-LEDs of light source 34, or otherwise effects a modulation of the light 36. An exemplary modulation frequency is, for example, 100 kHz, but this may be selected within very wide margins, and even be adjustable. Incidentally, there may also be provided a separate light source control, which may be connected itself to the sensor control 54, or a general control device. The light intensity of the light source 34 may be adjusted within associated limits, for example, by increasing the supplied power.

There may be provided a not shown power supply for the light source 34, for the sensor 24, and even for the vehicle 9 as a whole. It should be noted that neither the power supply, nor any of the sensor control 54, the sensor image processor 52 to be described hereinafter, or even the light source 34, need be provided in the sensor 24, but may, for example, also be provided elsewhere on the vehicle. The connections may be wired or wireless connections.

In a variant, the exit optical device 38 is provided at the inner side of the front side, the front side being made from a material which is transmissible for the emitted light. In this manner the exit optical device 38, and in general the interior of the sensor 24, is protected from external influences, while a flat front side of synthetic material can easily be cleaned.

In the outgoing beam 40, or in many cases in the observation area, there is an object 44, such as a calf, a cow's leg or the like, which is irradiated by a first ray 42. The object 44 will partially reflect that first ray 42 in a reflected beam 46. Only a small part thereof is depicted, which is formed into an image by the entrance optical device 48. The entrance optical device 48 may also effect an adaptation of the image to the desired observation area or vice versa, and may, for example, be designed for this purpose as an adjustable lens or even as a zoom lens.

In the housing 33 there is further included a place-sensitive receiver device, such as a CMOS or a CCD or the like. The receiver device comprises a matrix with a plurality of rows and columns of receivers 50-1, 50-2, 50-3, . . . , in the form of photodiodes or other light-sensitive elements. In another embodiment, this is a matrix of 64×64 photodiodes, but resolutions of 176×144, 640×480, and other, smaller or larger, matrices are likewise possible. For the sake of clarity, only a very small number of receivers, and only in one single row, are depicted in FIG. 3. Here, the reflected beam 46 is found to be displayed on the receiver 50-3, which will supply a signal. It will be obvious that, if, for example, the object 44 is larger, or the resolution of the sensor 24 is greater, there will be per object 44 a plurality of receivers 50-1, . . . , which will supply a signal. This is also the case if a plurality of objects 44 are present in the observation area.

Consequently, in the depicted case, (only) the receiver 50-3 supplies a signal, from which a phase can be determined through implementation of known techniques, such as sampling at four points, at a known frequency. For this purpose, the sensor image processing device 52 may, for example, be equipped with suitable circuits. The sensor control 54 may also be equipped for this purpose.

This phase is compared with the phase of a reference ray 56 which is transmitted to and received by a reference receiver 58. It is not relevant whether the latter is located immediately next to the light source 34, as long as the optical path length, and consequently the acquired phase difference of the reference ray 56, between the light source 34 and the reference receiver 58, is known.

For each receiver 50-1, . . . , there is determined, from the phase difference between the reference ray 56 and the beam reflected on the receiver, a distance with the known relation between wavelength and phase difference. This takes place in principle substantially parallel and simultaneously for each of the receivers 50-1, . . . . There is thus created a 2D collection of distances, from which a spatial image of the observed object 44 can be formed.

If necessary, the measurement is also performed at one or more other modulation wavelengths, in order to achieve a unique determination in distance, or an increased accuracy. If desired, it is also possible to repeat the measurement at one and the same modulation wavelength, for example for an increased reliability, to take changes in the observation area into account, such as movement, or even to determine a speed of an object 44 in that observation area, by measuring the change of a distance. For this purpose, the sensor control 54 may be arranged in a simple manner. A favourable repeat speed is, for example, at least 16 Hz, because it is thus possible to display movements sufficiently flowing, at least for human beings. For higher accuracy of control, a higher repeat speed, such as 50 Hz or 100 Hz is even better. Other repeat speeds are possible as well, such as, for example, 1 Hz to 2 Hz, such as for unanimated objects, such as a feed loading place or a not shown milking machine.

In a particular embodiment, short light pulses may be emitted by the light source 34, provided that each light pulse comprises at least one whole wave, preferably two or more waves, of the modulated signal. At the modulation frequencies occurring in practice, this can easily be realized.

It will be obvious that the invention is not limited to the preferred embodiments of the unmanned vehicle shown in the figures and described in the foregoing, but that numerous modifications are possible within the scope of the accompanying claims. Thus, the invention has been described by reference to certain embodiments discussed above. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. Unmanned vehicle for supplying liquid feed to an animal, comprising a frame, with disposed thereon:
   a propulsion mechanism;
   a container for storing the liquid feed;
   a feed supplier for supplying the liquid feed;
   an animal identifier configured to supply an identification signal which is indicative of identity of the animal; and
   a navigator connected to the propulsion mechanism with a sensor for forming an image of an observation area, the sensor comprising:
   a source of radiation for emitting modulated electromagnetic radiation,
   a receiver device for receiving electromagnetic radiation reflected by an object in the observation area, comprising a matrix with a plurality of rows and a plurality of columns of receivers,
   an optical device for displaying imaging the reflected electromagnetic radiation on the receiver device, and
   a sensor image processor configured to determine for each of the receivers a phase difference between the emitted electromagnetic radiation and the reflected electromagnetic radiation in order to calculate a distance from the receiver to the object and generate a spatial image thereof,
   wherein the sensor image processor is configured to recognize at least one of a feed loading place, a feed unloading place, an animal, and a part of an animal based on the spatial image, and the navigator is controllable by the sensor image processor for controlling movement of the vehicle, and
   wherein the feed supplier comprises an operable valve and a drinking nozzle movably supported on a height adjusting mechanism for vertical movement of said drinking nozzle with respect to the vehicle for supplying the liquid feed, the feed supplier being controllable by the sensor image processor and the identification signal for adjusting a height of the drinking nozzle for supplying feed for the identified animal.

2. The vehicle according to claim 1, wherein the sensor image processor configured to form a three-dimensional image of the observation area.

3. The vehicle according to claim 1, wherein the sensor image processor configured to form a three-dimensional image of an object in the observational area.

4. The vehicle according to claim 1, wherein at least one of the receiver device and the source of radiation is disposed at least one of rotatably and telescopically.

5. A device for supplying feed to an animal, comprising a vehicle according to claim 1 and a feed loading place, wherein the sensor image processor is configured to recognize a feed loading place, and the feed loading place comprises an autonomously displaceable milking implement.

6. The vehicle according to claim 1, wherein the sensor image processor is further configured to determine changes in the identified animal.

7. The vehicle according to claim 6, wherein the sensor image processor is further configured to determine a change in at least one of a height and a size of the identified animal.

8. The vehicle according to claim 6, wherein the feed supplier is mounted movably relative to the rest of the vehicle.

9. The vehicle according to claim 1, further comprising at least one of a connection for electrical feeding and a connection to a feed loading place for receiving feed, and wherein the sensor image processor is arranged to couple the connection to a counter-connection for that connection, by recognizing the connection and the counter-connection and minimizing the mutual distance between the connection and the counter-connection.

10. The vehicle according to claim 9, wherein the connection to the feed loading place is configured to receive liquid feed.

11. The vehicle according to claim 1, wherein the sensor image processor is configured to recognize a feed loading place, and the feed loading place comprises at least one of a milk storage vessel and a milking implement.

12. The vehicle according to claim 1, further comprising a milking implement with automatically connectable teat cups and a milk storage vessel.

13. The vehicle according to claim 1, wherein movement of the drinking nozzle of the feed supplier is controllable by the sensor image processor for bringing the nozzle to the mouth of the animal.

14. The vehicle according to claim 1, wherein the feed supplier is controllable for supplying a particular sort of feed based on the identification signal to the identified animal.

15. The vehicle according to claim 1, wherein the sensor image processor is configured to recognize the feed loading place, feed unloading place, animal, or part of an animal based on the spatial image and previously stored information regarding position and/or orientation of one or more reference objects.

16. The vehicle according to claim 1, wherein the height adjusting mechanism is configured to attune a position of the drinking nozzle to the dimensions of an animal by using a height adjusting device.

17. The vehicle according to claim 16, wherein the height adjusting mechanism adjusts the height of the drinking nozzle to a height of the identified animal at at least one feed unloading place.

* * * * *